(12) United States Patent
Nozaki et al.

(10) Patent No.: US 6,843,024 B2
(45) Date of Patent: Jan. 18, 2005

(54) WEATHER STRIP INCLUDING CORE-REMOVAL SLOT

(75) Inventors: Masahiro Nozaki, Aichi-ken (JP); Yoshihisa Kubo, Aichi-ken (JP); Tomonori Inoue, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 62 days.

(21) Appl. No.: 10/155,979

(22) Filed: May 29, 2002

(65) Prior Publication Data

US 2002/0178656 A1 Dec. 5, 2002

(30) Foreign Application Priority Data

May 31, 2001 (JP) .......................................... 2001-165422
Nov. 22, 2001 (JP) .......................................... 2001-358202

(51) Int. Cl.[7] ................................................. E06B 7/16
(52) U.S. Cl. ...................................... 49/490.1; 49/498.1
(58) Field of Search ............................. 49/475.1, 490.1, 49/498.1

(56) References Cited

U.S. PATENT DOCUMENTS

| 4,769,947 | A |   | 9/1988  | Ogawa et al.            |
| 4,884,370 | A |   | 12/1989 | Nozaki et al.           |
| 4,986,947 | A |   | 1/1991  | Shigeki et al.          |
| 5,258,157 | A |   | 11/1993 | Nozaki et al.           |
| 5,269,101 | A |   | 12/1993 | Nozaki et al.           |
| 5,538,578 | A | * | 7/1996  | Sugawara et al. ... 156/245 |
| 5,618,608 | A | * | 4/1997  | Teishi ............... 428/122 |
| 5,871,682 | A | * | 2/1999  | Kii et al. ............ 264/285 |
| 5,972,268 | A |   | 10/1999 | Nakajima et al.         |
| 6,007,753 | A |   | 12/1999 | Nagata                  |
| 6,395,355 | B1| * | 5/2002  | Nakajima et al. ... 428/34.1 |
| 6,571,514 | B1| * | 6/2003  | Aritake ........... 49/490.1 |

* cited by examiner

Primary Examiner—Jerry Redman
(74) Attorney, Agent, or Firm—Posz & Berthards, PLC

(57) ABSTRACT

A weather strip having a high sealing capability and an aesthetic appearance when attached to a vehicle body. The weather strip includes an extruded portion and a molded portion connected to the extruded portion and having a trim and a hollow seal. The trim includes a first wall from which the hollow seal extends. The first wall has a slot provided with a rounded corner. A second wall extends from the first wall in a direction opposite the hollow seal. A third wall extends from the second wall in a manner opposing the first wall. The third wall includes a cutaway portion defined at a position facing the slot of the first wall. The cutaway portion includes a rounded corner. A core used to mold the hollow seal of the molded portion is removed from the molded portion through the slot and the cutaway portion.

10 Claims, 7 Drawing Sheets

WEATHER STRIP INCLUDING CORE-REMOVAL SLOT

CROSS-REFERENCE TO RELATED APPLICATIONS

This application is related to and claims priority from Japanese Patent Application Nos. 2001-165422 and 2001-358202, the contents of which are incorporated herein by reference.

BACKGROUND OF THE INVENTION

1. Field of the Invention

The present invention relates to a weather strip, which is attached to a vehicle body around an opening that is opened and closed by a door, such as an opening trim weather strip.

2. Description of Related Arts

A weather strip used for a vehicle includes a generally U-shaped trim and a hollow seal, which extends from a side wall or a bridging wall of the trim. Such a weather strip is required to seal gaps between the vehicle body and the door when the door is closed. In other words, such a weather strip must be airtight and waterproof when the door is closed.

To form the weather strip, extrusion molding is performed to manufacture an elongated, extruded portion. The elongated portion is then bent in a looped manner so that a predetermined sealing is obtained around an entire opening. Alternatively, a plurality of extruded portions are connected to each other and bent in a looped manner. The two ends of the single extruded portion or the two ends of the connected extruded portions are then arranged in a mold. Injection molding is then performed to form a molded portion that joins the two ends. This completes the formation of the weather strip (first related art example).

In the weather strip of the first related art example, a hollow seal must also be formed on the molded portion between the ends of the extruded portion. Thus, referring to FIG. 12, a core 103 must be arranged in a cavity of a molding device to form a hollow seal 102 when molding a molded portion 101. The core 103 has ends 104 that are fitted in opposing ends 106 of extruded portions 105a, 105b to prevent molding material from entering the extruded portions 105a, 105b. After the molded portion 101 is molded, most of the core 103 is enveloped by a material such as rubber. Thus, a slit must be provided on a hollow seal 102 of one of the extruded portions 105a, 105b or the hollow seal 102 of the molded portion 101 to remove the core 103 from the hollow seal 102 of the molded portion 101.

Figure 12:
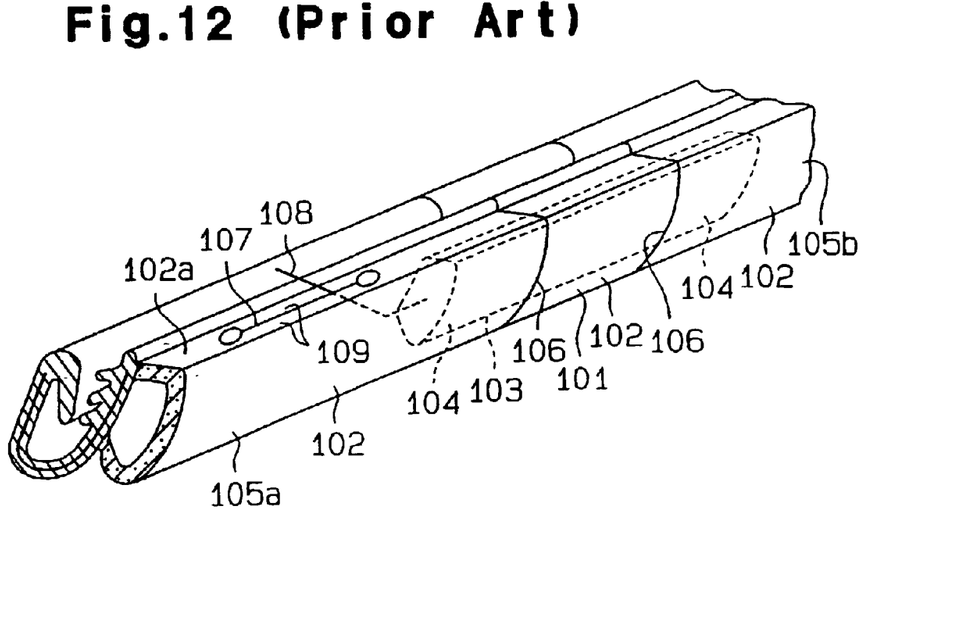
FIG. 12 is a perspective view showing a conventional weather strip.

In the example of FIG. 12, a slit 107 is provided in a side wall 102a of the hollow seal 102 near the end 106 of the extruded portion 105a. In this case, a removing handle 108 is attached to the core 103. The core 103 is arranged in the cavity of the mold so that the distal end of the removing handle 108 extends out of the slit 107. A molding material, such as rubber, is injected into the cavity. This molds the molded portion 101. After the molded portion 101 is formed, the molded portion 101 is removed from the mold. Then, the removing handle 108 is pulled to remove the core 103 out of the hollow seal 102 through the slit 107.

Further, there are vehicles that have a garnish attached around the lower half of a door opening (i.e., the portion lower than the belt line of a door). In such a vehicle, a plurality of weather strips are attached on the vehicle body around the door opening so that the weather strips maintain satisfactory seal along the entire periphery of the door opening. One type of such weather strips includes a single extruded portion, which is similar to that of the weather strip of the first related art example, and the molded portions, which are connected to both ends of the extruded portion. Each molded portion includes a hollow seal and a trim, which are formed continuously from the extruded portion. The hollow seal of the molded portion has a curved portion, the amount of projection from the trim of which decreases gradually at positions closer to the end of the weather strip (second related art example).

To mold the molded portion of the second related art weather strip, a core similar to that used in the first related art weather strip example must be arranged in the cavity of the mold. Further, a slit must be provided in the hollow seal of the molded portion or extruded portion. The slit is normally located in a side wall of the hollow seal.

However, the slit 107, which is provided in the side wall 102a of the hollow seal 102 in the molded portion or the extruded portion, decreases the rigidity of the hollow seal 102. This locally decreases the sealing capability of the weather strip.

To solve such problem, an adhesive may be used to bond the slit 107 after the core 103 is removed. However, the application of such adhesive is burdensome since thin, flexible lips, which are located on each side of the slit 107, must be bonded to each other as described below. This increases manufacturing costs.

Figure 13:
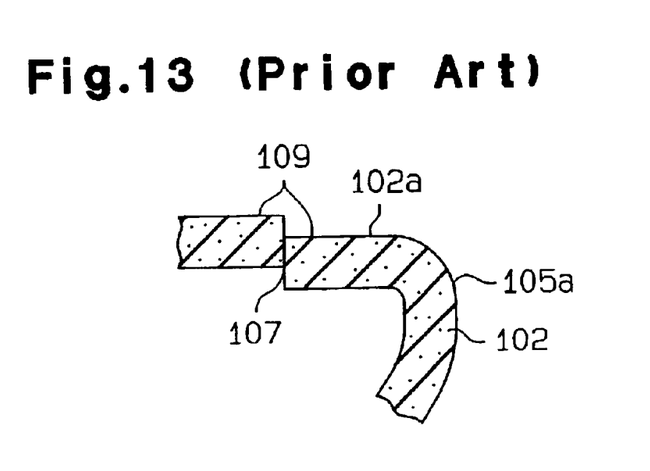
FIG. 13 is a cross-sectional view showing the weather strip of FIG. 12 in a state in which lips defining a slit are not aligned with each other.

In addition, the hollow seal 102 is designed so that it is highly elastic in order to obtain the required sealing capability. Thus, when lips 109 located on each side of the slit 107 are adhered together, the lips 109 may not be aligned with each other, as shown in FIG. 13. When the weather strip is attached to the vehicle body around a door opening with its lips 109 adhered to each other in a non-aligned state, the hollow seal 102 may become undulated. This would cause the appearance of the weather strip to be undesirable.

To prevent the undulating of the hollow seal 102, the lips 109 must be adhered together so that their surfaces are flush to each other. This requires accurate positioning of the lips 109. In such case, the adhering of the lips 109 would become burdensome and increase manufacturing costs.

It is especially difficult to adhere the lips 109 in the second related art weather strip when the lips 109 are formed on the curved portion. Further, when the lips 109 of the curved portion are adhered to each other, a force acting to tear the adhered portion is applied to the weather strip.

SUMMARY OF THE INVENTION

It is an object of the present invention to provide a weather strip having a high sealing capability and an aesthetic appearance when attached to a vehicle.

To achieve the above object, the present invention provides a weather strip including an extruded portion and a molded portion connected to the extruded portion. The extruded portion and the molded portion each have a trim and a hollow seal. The weather strip includes a first wall provided on the trim of the molded portion and having a slot. The hollow seal of the molded portion extends from the first wall. The slot is positioned to permit the removal, through said slot, of a core used to mold the hollow seal.

A further perspective of the present invention is a weather strip including an extruded portion and a molded portion connected to the extruded portion. The extruded portion and the molded portion each have a trim and a hollow seal. The trim of the molded portion includes a first wall from which the hollow seal extends. The first wall has a slot provided with a rounded corner. A second wall extends from the first wall in a direction opposite from the direction from which the hollow seal extends from the first wall. A third wall extends from the second wall in a manner opposing the first wall. The third wall includes a cutaway portion defined at a position facing the slot of the first wall. The cutaway portion includes a rounded corner. The slot and the cutaway portion are positioned to permit the removal, through the slot and the cutaway portion, of a core used to mold the hollow seal of the molded portion.

A further perspective of the present invention is a method for molding a weather strip that includes an extruded portion and a molded portion connected to the extruded portion. The extruded portion and the molded portion each have a trim and a hollow seal. The method includes connecting a core to the extruded portion to mold the hollow seal, setting the core in a mold, charging a material in the mold to mold the molded portion that includes the trim and the hollow seal, which is molded about the core, taking out the molded portion from the mold, and removing the core from the molded portion through a slot that is defined in the trim.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A weather strip 11 according to a first embodiment of the present invention will now be discussed with reference to FIGS. 1 to 5. The weather strip 11 is an opening trim weather strip and attached to a vehicle body along the periphery of a door opening.

Referring to FIGS. 1, 2, 4, and 5, the weather strip 11 includes trims 12a, 12b and hollow seals 13a, 13b. The weather strip 11 is formed by bending an elongated extruded portion 14, which is manufactured by performing extrusion molding, so that the two ends 15 of the extruded portion 14 are opposed to each other. The two ends 15 are then connected in a generally linear manner by a molded portion 16. Thus, the weather strip 11 is looped.

The trims 12a, 12b are made of, for example, EPDM (of ethylene propylene diene terpolymer) solid rubber and have a generally U-shaped cross-section. A metal insert 21, which reinforces the trim 12a, is embedded in the trim 12a of the extruded portion 14. The insert 21 includes a plurality of pieces, which are directly connected to one another or connected to one another by means of a narrow bridged portion. The pieces enable the trim 12a to be bent in a two-dimensional or three-dimensional manner.

The trim 12a of the extruded portion 14 has a holding lip 25 extending from an inner surface 23 of an inner side wall 22, which is located on the vehicle interior side of the trim 12a. The holding lip 25 extends longitudinally along the trim 12a and toward a bridging wall 24 of the trim 12a. A plurality of holding ribs 28 are formed on an inner surface 27 of an outer side wall 26, which is located on the vehicle exterior side of the trim 12a. The holding ribs 28 extend longitudinally along the trim 12a. The hollow seal 13a, which is made of, for example, EPDM sponge rubber, is formed integrally with an outer surface 29 of the outer side wall 26. The hollow seal 13b of the molded portion 16 is made of, for example, the same EPDM solid rubber as the trim 12b of the extruded portion 14 and formed in a manner continuous to the hollow seal 13a of the extruded portion 14.

Figure 1:
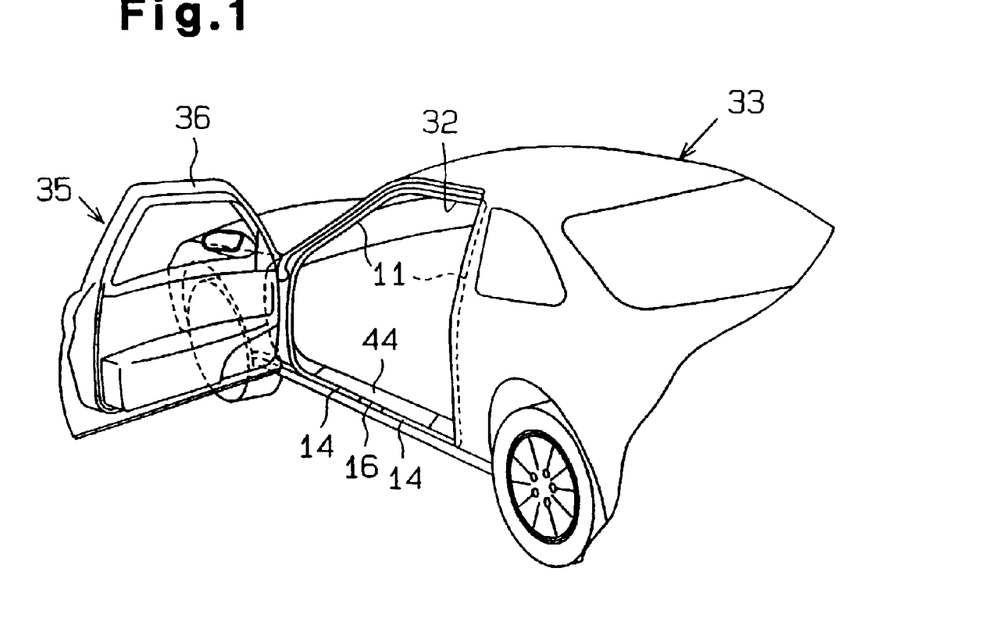
FIG. 1 is a perspective view showing a weather strip, which is attached to a vehicle body, according to a first embodiment of the present invention.
Figure 2:
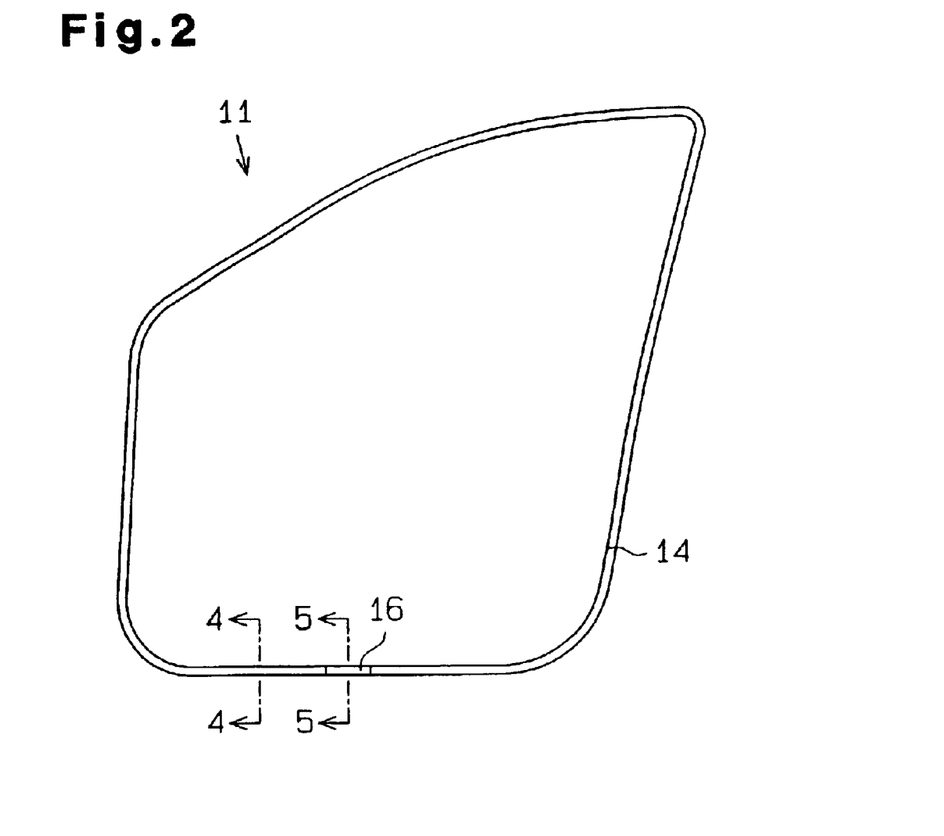
FIG. 2 is a front view showing the weather strip of FIG. 1.

To attach the weather strip 11 to a vehicle body at the periphery of a door opening 32, referring to FIGS. 1 and 2, the molded portion 16 is arranged at a position corresponding to the lower middle portion of the periphery of the door opening 32. Further, the hollow seals 13a, 13b are arranged on the exterior side of the vehicle. In this state, the trims 12a, 12b are fitted to a flange 34 of a body panel 33. The flange 34 defines the periphery of the door opening 32. In this state, the flange 34 is arranged between the holding lip 25 and the holding ribs 28 of the trim 12a. Thus, the weather strip 11 is fitted on the flange 34 by the elastic force of the holding lip 25 and the holding ribs 28.

The weather strip 11 is attached to the periphery of the door opening 32 so that the hollow seals 13a, 13b of the extruded portion 14 and the molded portion 16 elastically contact the periphery of a door panel 36 when a door 35 is closed. Thus, when the door 35 is closed, the hollow seals 13a, 13b elastically deform as shown by the two-dot chain lines in FIGS. 4 and 5. This presses the hollow seals 13a, 13b against the periphery of the door panel 36 and seals the passenger compartment of the vehicle.

Figure 3:
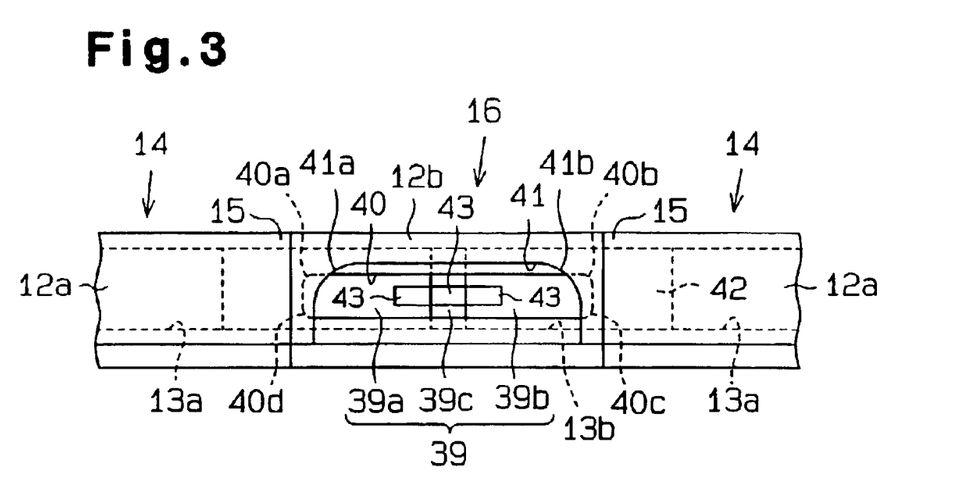
FIG. 3 is a partially, enlarged rear view showing the weather strip of FIG. 2.
Figure 4:
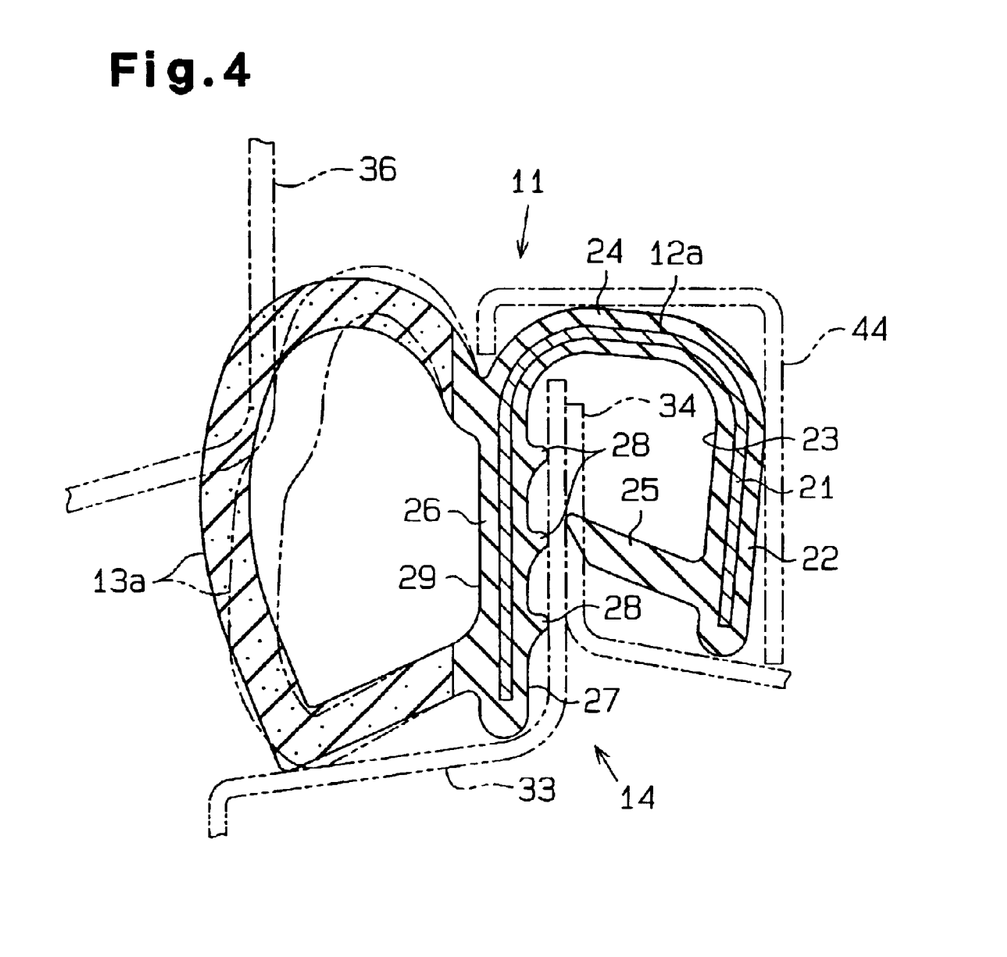
FIG. 4 is a cross-sectional view taken along line 4—4 in FIG. 2.
Figure 5:
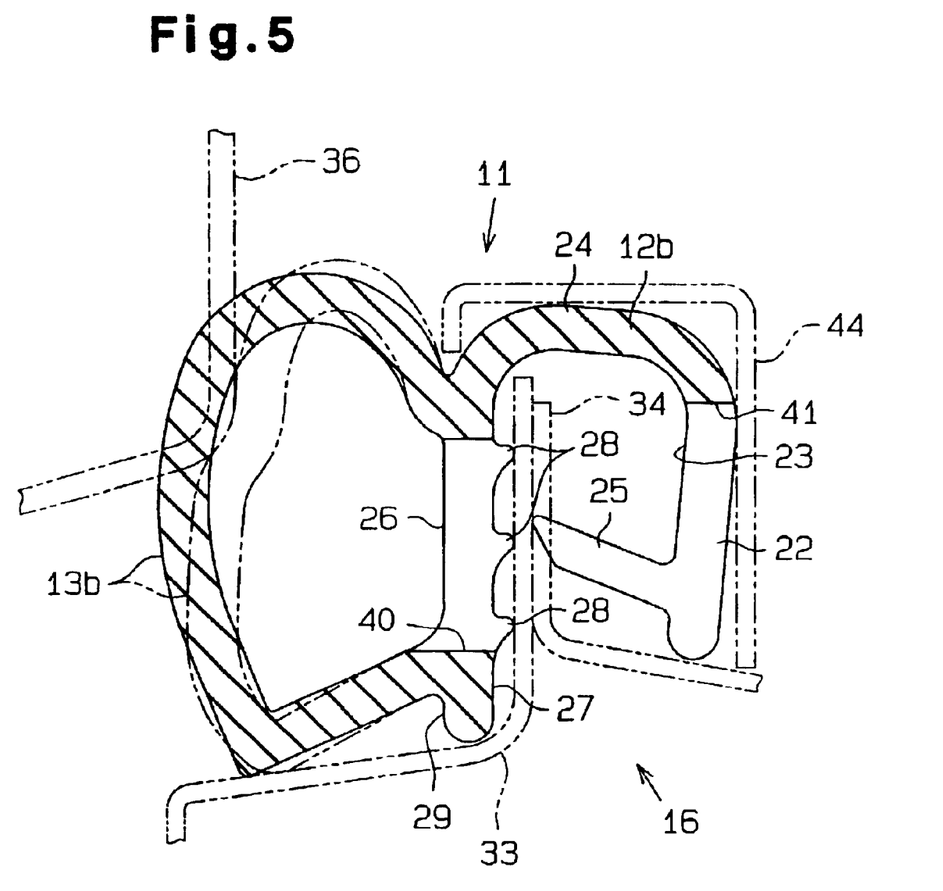
FIG. 5 is a cross-sectional view taken along line 5—5 in FIG. 2.

As shown in FIGS. 3 and 5, a slot 40 is formed in an outer side wall (first wall) 26 of the trim 12b in the molded portion 16. A core 39, which is used to form the hollow seal 13b when molding the molded portion 16, is removed through the slot 40. The slot 40 is rectangular and has rounded corners 40a, 40b, 40c, 40d.

Further, a rectangular cutaway portion 41 is defined in an inner side wall (third wall) 22 of the trim 12b at a position facing the slot 40. The cutaway portion 41 has rounded corners 41a, 41b, which are located on the side closer to a bridging wall (second wall) 24 of the trim 12b. The bridging wall 24 connects the outer and inner side walls 22, 26.

When the weather strip 11 is attached to the periphery of the door opening 32, a scuff plate 44, which serves as a cover, is fastened to the vehicle body so that the scuff plate 44 covers the outer surface of the trims 12a, 12b at the lower portion of the periphery of the opening 32. Thus, the slot 40 and the cutaway portion 41, which are provided in the trim 12b of the molded portion 16 are not exposed.

The core 39 includes a core body 42, which is shaped in accordance with the inner surface of the hollow seals 13a, 13b, and tabs 43, which extend from the outer surface of the core body 42. Further, as shown in FIG. 3, the core 39 is divided into two end segments 39a, 39b and a middle segment 39c. One of the tabs 43 is provided on each of the segments 39a–39c.

A method for manufacturing the weather strip 11 will now be discussed.

The extruded portion 14 is prepared by extrusion molding and cutting the extruded product into a predetermined length in accordance with the circumferential length of the flange 34 of the door opening 32. The elongated extruded portion 14 is bent in accordance with the shape of the door opening 32, and the two ends 15 of the extruded portion 14 are opposed to each other. Then, the distal ends of the end segments 39a, 39b of the core 39 are fitted in the hollow seal 13a of the extruded portion 14. In this state, the segments 39a–39c are connected integrally to one another. The two ends 15 of the extruded portion 14 are set in the cavity of a molding device. Then, EPDM solid rubber or EPDM sponge rubber is charged in the cavity. Alternatively, EPDM solid rubber and EPDM sponge rubber may both be charged in the cavity. This molds the trim 12b and the hollow seal 13b of the molded portion 16.

The molded portion 16 is vulcanized. When the molded portion 16 hardens and its shape is stabilized, the weather strip 11 is removed from the molding device. The tab 43 associated with the middle segment 39c is then pulled straight away from the hollow seal 13b to remove the core 39 from the hollow seal 13b through the slot 40 and the cutaway portion 41 of the molded portion 16. The tab 43 associated with one of the end segments 39a, 39b is used to move the end segment 39a or 39b along the longitudinal direction of the hollow seal 13b toward the middle of the slot 40. Then, the end segment 39a or 39b is pulled out of the slot 40 and the cutaway portion 41 in the same manner as the middle segment 39c. Finally, the other one of the end segments 39a, 39b is removed in the same manner from the hollow seal 13b. This completes the weather strip 11.

The first embodiment has the advantages described below.

(1) In the weather strip 11, the slot 40, which is used to remove the core 39 from the hollow seal 13b after the molded portion 16 is molded, is located on the trim 12b of the molded portion 16. Since the hollow seals 13a, 13b do not have the slot 40, the rigidity of the hollow seal 13b in the molded portion 16 remains unchanged. Accordingly, the sealing capacity of the hollow seals 13a, 13b near the slot 40 is prevented from decreasing.

Further, the slot 40 is not visible from the hollow seal 13b. In addition, the hollow seal 13b does not deform when the weather strip 11 is attached to the flange 34 of the door opening 32. Thus, the weather strip 11 is not undulated when attached to the vehicle body. This maintains the appearance of the weather strip 11 in a satisfactory state.

(2) In the weather strip 11, the slot 40, which is used to remove the core 39, is formed in the outer side wall 26 of the U-shaped trim 12b in the molded portion 16. Further, the hollow seal 13b extends outward from the outer side wall 26.

Thus, the core 39 is easily removed from the molded portion 16 with a simple structure. Further, the slot 40 does not have to be bonded since the slot 40 is not located on the hollow seal 13b. This increases the productivity of the weather strip 11.

(3) In the weather strip 11, the corners 40a–40d of the slot 40 are rounded. Thus, when the core 39 is removed through the slot 40, stress does not concentrate at the corners 40a–40d of the slot 40. This prevents the periphery of the slot 40 from tearing.

(4) In the weather strip 11, the hollow seal 13b extends toward the exterior of the vehicle from the outer side wall 26 of the U-shaped trim 12b. Further, the slot 40 is provided on the outer side wall 26. The cutaway portion 41 is provided on the inner side wall 22 of the trim 12b at a position corresponding to the slot 40.

Accordingly, the core 39, which is divided into the segments 39a–39c, is easily removed by moving the segments 39a–39c along the longitudinal direction of the hollow seal 13b and away from the hollow seal 13b. Thus, the facilitated removal of the core 39 increases the productivity of the weather strip 11. Further, the employment of the core 39 enables automated removal of the core 39 and further improves productivity of the weather strip 11.

(5) In the weather strip 11, the corners 41a, 41b of the cutaway portion 41 that are located on the side of the bridging wall 24 are rounded to permit the passage of the core 39 during the removal of the core 39. Thus, when the core 39 is removed through the cutaway portion 41, stress does not concentrate at the corners 41a, 41b of the cutaway portion 41. This prevents the cutaway portion 41 from tearing.

(6) When the weather strip 11 is attached to the flange 34 of the door opening 32, part of the molded portion 16 is located at a position covered by the scuff plate 44. Thus, the scuff plate 44 covers the trims 12a, 12b at the lower portion of the periphery of the opening 32.

Accordingly, although the trim 12b includes the slot 40 and the cutaway portion 41, the trim 12b is covered by the scuff plate 44. This maintains the appearance of the weather strip 11 in a satisfactory state.

A weather strip 51 according to a second embodiment of the present invention will now be discussed with reference to FIGS. 6 to 11. The following description will center on parts differing from the first embodiment. Further, like or same reference numerals are given to those components that are the same as the corresponding components of the first embodiment.

Figure 6:
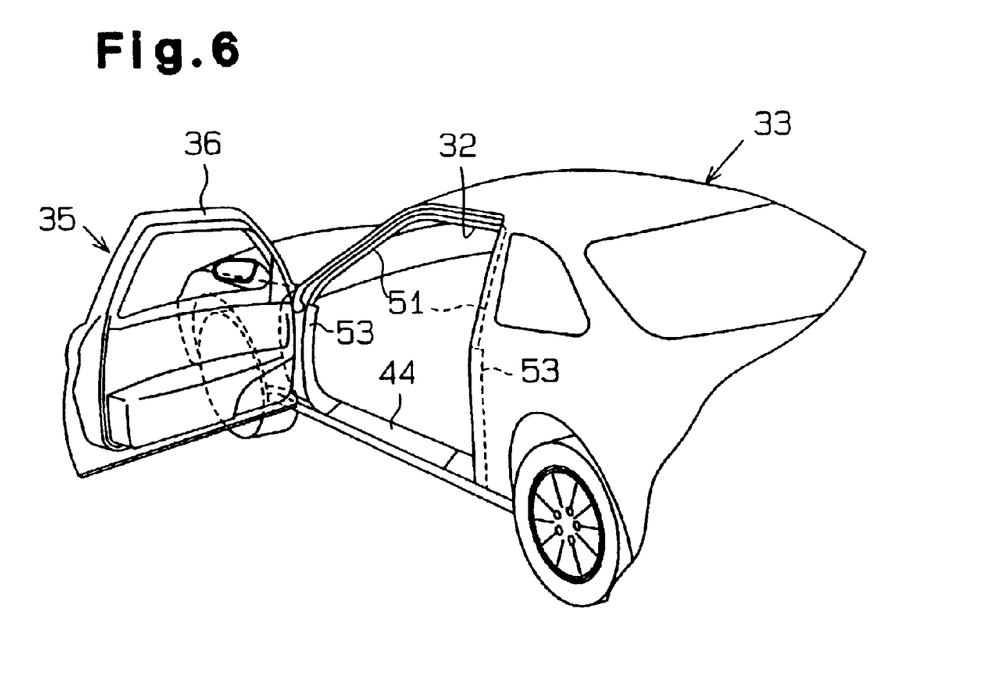
FIG. 6 is a perspective view showing a weather strip, which is attached to a vehicle body, according to a second embodiment of the present invention.
Figure 7:
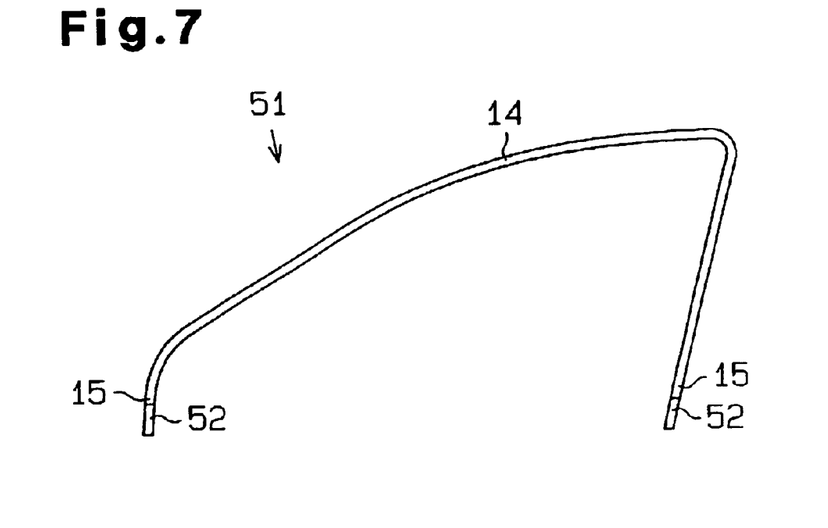
FIG. 7 is a front view showing the weather strip of FIG. 6.

Referring to FIGS. 6 and 7, the weather strip 51 is not looped and has molded portions 52, which are formed connected to each end 15 of an extruded portion 14. The weather strip 51 is attached to the vehicle body at the periphery of the door opening 32 above the belt line of the door panel 36. A garnish, which covers the surface of the body panel 33, is attached to the vehicle at the periphery of the opening 32 below the belt line. The distal ends of the molded portion 52, which serve as the ends of the weather strip 51, are fitted into the space between the body panel 33 and the garnish 53.

Figure 8:
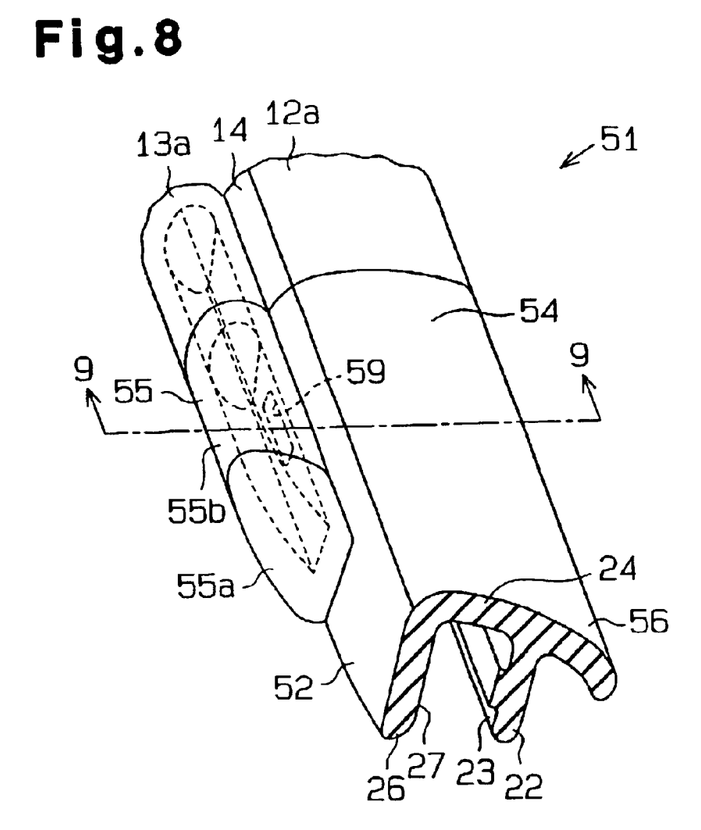
FIG. 8 is an enlarged perspective view showing the weather strip of FIG. 7.
Figure 9:
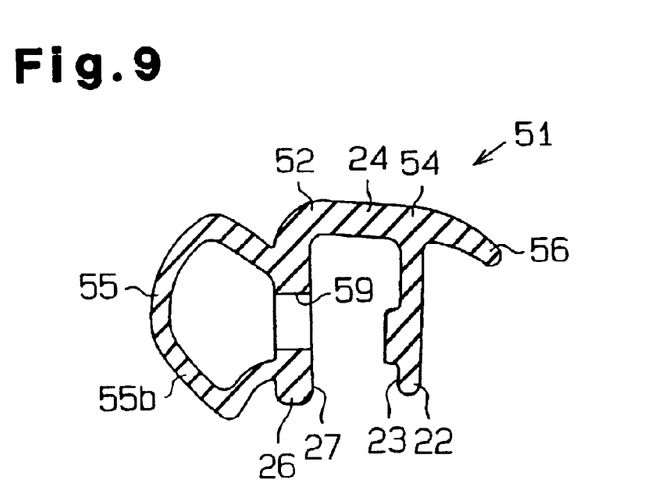
FIG. 9 is a cross-sectional view taken along line 9—9 in FIG. 8.

Referring to FIGS. 8 and 9, the weather strip 51 includes trims 12a, 54. A cover lip 56 extends in a direction opposite to hollow seals 13a, 55 from the bridging walls 24 of the trims 12a, 54. When the weather strip 51 is attached to the flange 34 of the body panel 33, the cover lip 56 comes into contact with a garnish or the like, which is attached to the body panel 33. This improves the appearance of the periphery of the door opening 32.

The hollow seal 55 of the molded portion 52 has a curved portion 55a. The projected amount of the curved portion 55a from the trim 54 decreases gradually at positions farther from the distal end of the extruded portion 14. A uniform portion 55b, the projected amount from the trim 54 of which is constant, extends between the curved portion 55a and the end of the hollow seal 55 that is connected to the extruded portion 14.

A slot 59 is formed in the outer side wall 26 of the trim 54 at a position corresponding to the uniform portion 55b of the hollow seal 55. A core 58, which is used to form the hollow seal 55 of the molded portion 52, is removed through the slot 59. In the same manner as the slot 40 of the weather strip 11 in the first embodiment, the slot 59 has rounded corners.

Figure 10:
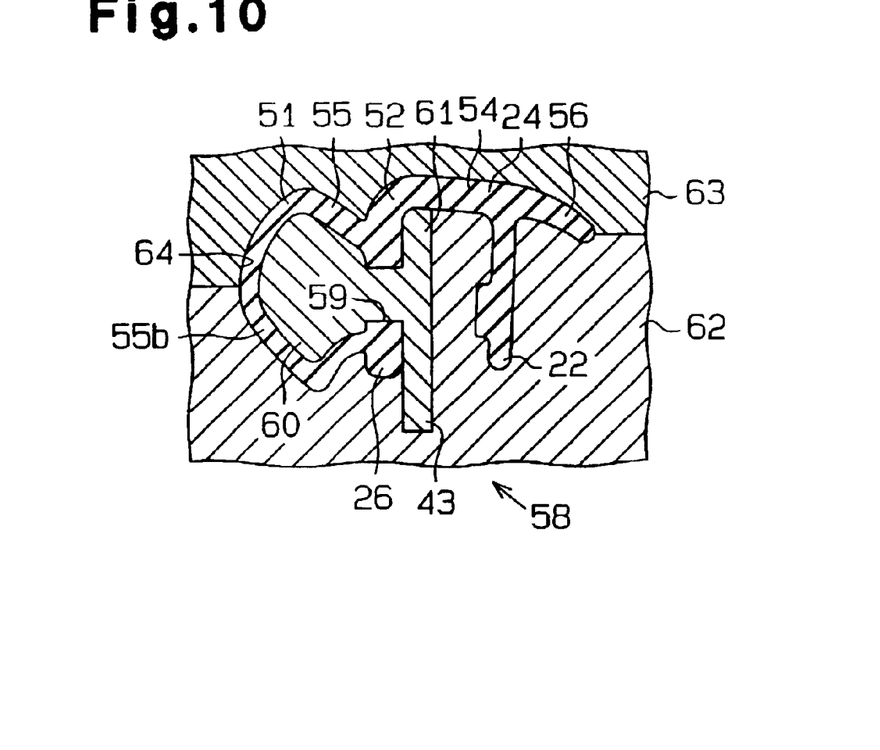
FIG. 10 is a cross-sectional view illustrating the manufacturing of the weather strip of FIG. 9.
Figure 11:
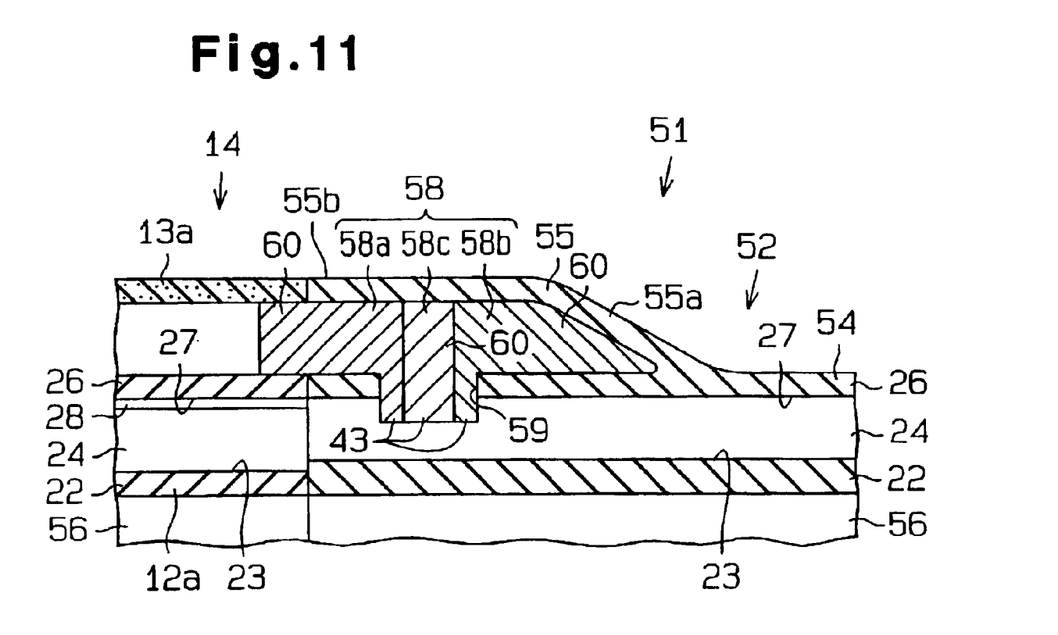
FIG. 11 is a cross-sectional view illustrating the manufacturing of the weather strip of FIG. 7.

Referring to FIGS. 10 and 11, the core 58 includes a core body 60, which is shaped in correspondence with the inner surface of the hollow seals 13a, 55, an extension 61, which is used to form part of the inner surface 27 of the outer side wall 26 in the trim 54, and tabs 43, which are formed continuously with the extension 61. The core 58 is formed from two end segments 58a, 58b and one middle segment 58c. The end segment 58a, traversing the extruded portion 14 and the molded portion 52, is generally cylindrical. In comparison, the end segment 58b arranged on the distal side of the weather strip 51 becomes thinner at positions closer to the distal end and resembles the beak of a bird.

To mold the molded portion 52 of the weather strip 51, the distal end of the end segment 58a is fitted into the hollow seal 55 of the extruded portion 14, which is cut into a predetermined length. In this state, the core 58 is set at a predetermined position in a movable mold 62 of a molding device. Afterward, the movable mold 62 is moved toward a fixed mold 63 to close the molds 62, 63 and form a cavity 64. A rubber material, such as EPDM, is then charged into the cavity 64 in the same manner as in the first embodiment to form the weather strip 51. The molded weather strip 51 is then removed from the molding device.

Subsequently, the tab 43 associated with the middle segment 58c of the core 58 is pulled to remove the middle segment 58c though the slot 59 of the molded portion 52 and a gap produced between the two side walls 22, 26 of the trim 54. The tab 43 associated with one of the end segments 58a, 58b is then held to move the end segment 58a or 58b toward the middle of the slot 59 in the longitudinal direction of the hollow seal 55. The end segment 58a or 58b is then pulled out of the slot 59 of the molded portion 52 and the gap between the two side walls 22, 26 in the same manner as the middle segment 58c. Finally, the other one of the end segments 58a, 58b is removed in the same manner. This completes the weather strip 51.

The second embodiment has the advantages described below.

(1) In the weather strip 51, the slot 59 is provided in the trim 54 of the molded portion 52. The slot 59 is used when removing the core 58, which is used to mold the hollow seal 55 of the molded portion 52 that is located at the end of the weather strip 51, from the molded portion 52 subsequent to molding.

Thus, the slot 59 for removing the core 58 is not provided in the hollow seal 13a of the extruded portion 14 or the hollow seal 55 of the molded portion 52. Accordingly, the sealing capability of the hollow seals 13a, 55 is not decreased.

Further, the slot 59 for removing the core 58 is not visible from the hollow seals 13b, 55. In addition, the hollow seals 13b, 55 are not distorted when the weather strip 51 is attached to the flange 34 of the door opening 32. Therefore, undulating of the hollow seals 13b, 55 does not occur. This maintains satisfactory appearance of the weather strip 51 when the weather strip 51 is attached to the flange 34.

(2) The slot 59 for removing the core 58 is formed in the outer side wall 26 of the U-shaped trim 54 in the molded portion 52. Further, the hollow seal 55 extends toward the exterior of the vehicle from the outer side wall 26.

Thus, the core 58 is easily removed from the molded portion 52 with a simple structure. Further, since the slot 59 is not located on the hollow seal 55, the slot 59 does not have to be bonded. This improves the productivity of the weather strip 51.

(3) In the weather strip 51, the corners of the slot 59 are rounded. Thus, when the core 58 is removed through the slot 59, stress does not concentrate at the corners of the slot 59. This prevents the periphery of the slot 59 from tearing.

(4) In the weather strip 51, the slot 59 for removing the core 58 is formed at a position corresponding to the uniform portion 55b of the hollow seal 55. The projected amount of the uniform portion 55b from the trim 54 is constant. In other words, the slot 59 is formed avoiding positions corresponding to the curved portion 55a of the hollow seal 55. Residual stress tends to be applied to the curved portion 55a during molding.

Accordingly, when the weather strip 51 is attached to the flange 34 of the door opening 32, undulating of the hollow seal 55 does not occur. This maintains satisfactory appearance of the weather strip 51.

It should be apparent to those skilled in the art that the present invention may be embodied in many other specific forms without departing from the spirit or scope of the invention. Particularly, it should be understood that the present invention may be embodied in the following forms.

In the above embodiments, the present invention is applied to the weather strips 11, 51 having the U-shaped trims 12a, 12b. However, the present invention may also be employed in a weather strip having an L-shaped trim, which includes only two walls. A hollow seal extends outward from the first wall, and a second wall extends in the opposite direction from one end of the first wall. In this case, the first wall of the trim is attached to a flange of a door opening, for example, by applying a double-side adhesive tape to the trim.

In the first embodiment, the cutaway portion 41 of the inner side wall 22 in the trim 12b may be eliminated.

In the above embodiments, the present invention is embodied in an opening trim weather strip, which is attached to the periphery of a door opening 32. However, the present invention may also be applied to an opening trim weather strip attached to the periphery of an opening of, for example, a rear door, a trunk lid, a sliding door, or a sliding roof.

The above embodiments employ the core 39, which is formed from the separate segments 39a–39c, and the core 58, which is from the segments 58a–58c. However, an integrally formed core may be employed instead. The divided cores 39, 58 are employed in the above embodiments to prevent the periphery, and especially, the corners, of the slots 40, 59 from tearing when the cores 39, 58 are removed through the corresponding slots 40, 59. However, if it is significant that productivity be increased, the integrally formed cores 39, 58 may be pulled in a direction substantially perpendicular to the longitudinal direction of the hollow seal to remove the cores 39, 59 from the hollow seal at once. This becomes possible by slightly enlarging the slots 40, 59, changing the molding material to a slightly softer one, or by slightly decreasing the fitted amount of the cores 39, 58 into the corresponding hollow seals 13a, 55. In such case, since the cores 39, 58 are not formed from separate segments, the cores 39, 58 do not have to be assembled before performing molding. This facilitates the setting of the cores 39, 58 to the mold and further improves productivity.

In the above embodiments, the extruded portion 14 is a single, continuous extruded product. However, a plurality of extruded products may be connected by one or more molded portions to form the extruded portion 14.

Instead of connecting a molded portion to the ends of a weather strip, the present invention may be applied to a weather strip having ends that are fitted into the gap between the body panel 33 and a vehicle interior member, such as the scuff plate 44 or a garnish.

In the second embodiment, the present invention is applied to a weather strip that is attached to the periphery of the door opening 32 at a position above the belt line. However, the present invention may also be applied to a weather strip that is attached at a position below the belt line, such as a weather strip for a hard top vehicle.

It should be apparent to those skilled in the art that the present invention may be embodied in many other specific forms without departing from the spirit or scope of the invention. Particularly, it should be understood that the present invention may be embodied in the following forms.

What is claimed is:

1. A weather strip for a vehicle including an extruded portion and a molded portion connected to the extruded portion, wherein the extruded portion and the molded portion each have a U-shaped trim and a hollow seal, the weather strip comprising:

a first wall provided on the trim of the molded portion and having a slot, wherein the hollow seal of the molded portion extends from the first wall, and said slot is positioned to permit the removal, through said slot, of a core used to mold the hollow seal of the molded portion;

a second wall provided on the trim of the molded portion and extending from the first wall in a direction opposite to the direction in which the hollow seal extends from the first wall, the first wall being located outward from the second wall toward the exterior of the vehicle; and a third wall provided on the trim of the molded portion and extending from the second wall such that the third wall opposes the first wall.

2. The weather strip according to claim 1, wherein the slot has a rounded corner.

3. The weather strip according to claim 1, wherein the molded portion is attached to a flange defining an opening of a vehicle, the slot of the molded portion being covered by a cover when the molded portion is attached to the flange.

4. The weather strip according to claim 1, wherein the extruded portion includes two ends, and the molded portion connects the two ends.

5. The weather strip according to claim 1, wherein the trim and the hollow seal of the extruded portion are connected with the trim and the hollow seal of the molded portion, respectively.

6. A weather strip including an extruded portion and a molded portion connected to the extruded portion, wherein the extruded portion and the molded portion each have a trim and a hollow seal, the weather strip comprising:

a first wall provided on the trim of the molded portion and having a slot, wherein the hollow seal of the molded portion extends from the first wall, and said slot is positioned to permit the removal, through said slot, of a core used to mold the hollow seal of the molded portion; and a second wall extending from the first wall in a direction opposite to the direction in which the hollow seal extends from the first wall; and a third wall extending from the second wall such that the third wall opposes the first wall, wherein the third wall has a cutaway portion defined at a position facing the slot of the first wall to permit the removal of the core through the slot and the cutaway portion.

7. The weather strip according to claim 6, wherein the cutaway portion has a rounded corner.

8. A weather strip comprising:

an extruded portion; and a molded portion connected to the extruded portion, wherein the extruded portion and the molded portion each have a trim and a hollow seal, wherein the trim of the molded portion includes:

a first wall from which the hollow seal extends, the first wall having a slot;

a second wall extending from the first wall in a direction opposite to the direction in which the hollow seal extends from the first wall; and a third wall extending from the second wall in a manner opposing the first wall, wherein the third wall includes a cutaway portion defined at a position facing the slot of the first wall;

wherein said slot and said cutaway portion are positioned to permit the removal, through said slot and said cutaway portion, of a core used to mold the hollow seal of the molded portion.

9. The weather strip according to claim 8, wherein the molded portion is attached to a flange defining an opening of a vehicle, the slot and the cutaway portion of the molded portion being covered by a cover when the molded portion is attached to the flange.

10. The weather strip according to claim 8, wherein the extruded portion includes two ends, and the molded portion connects the two ends.

* * * * *